July 15, 1969 L. W. PARTRIDGE 3,456,212

VANE-CONTROLLED OSCILLATOR CIRCUITS

Filed Jan. 28, 1966

INVENTOR
LESLIE W. PARTRIDGE

BY Mason, Kolehmainen, Rathburn & Wyss.
ATTORNEYS

United States Patent Office 3,456,212
Patented July 15, 1969

3,456,212

VANE-CONTROLLED OSCILLATOR CIRCUITS

Leslie W. Partridge, Janesville, Wis., assignor to The Burdick Corporation, Milton, Wis., a corporation of Delaware Filed Jan. 28, 1966, Ser. No. 523,790
Int. Cl. H03b *5/00, 3/02;* A61b *5/02*
U.S. Cl. 331—117 5 Claims

ABSTRACT OF THE DISCLOSURE

An oscillator includes a transistor with input and output circuits having inductively coupled coils providing a feedback path selectively interrupted by a movable vane. The oscillator is non-self regulated and thus highly sensitive to vane position since the direct current bias for the oscillator is developed by a biasing circuit in which resistance is not capacitance shunted and the time constant is negligible. Loading of the vane is minimized by a semiconductor junction shunting the output coil. The semiconductor junction may be a diode or the base-emitter junction of an additional transistor used to detect and amplify oscillations.

The present invention relates to cardiotachometer alarm circuits of the type including vane controlled oscillators, and also to improved vane controlled oscillators.

Vane controlled oscillators are known and are used in many different applications. In known arrangements, the oscillator circuit includes spaced coils arranged along the path of movement of a vane, and movement of the vane between and away from the coils is effective to change the condition of the oscillator between steady state and oscillating conditions.

One application of vane controlled oscillators is in cardiotachometer alarm circuits wherein the controlling vane is moved by a heart beat rate meter and the vane controlled oscillator is used to provide an alarm when the heart beat rate reaches a critical condition, i.e. either above or below predetermined limits. In this, as in other applications, it is highly important that the oscillator be very sensitive to vane position, in order that a small increment of movement of the vane is able to change the oscillator abruptly between oscillating and non-oscillating conditions. It is also important that the operation of the oscillator not load the meter vane and impair the accuracy of the meter reading. Vane controlled oscillators developed heretofore are unsatisfactory in these respects.

Cardiotachometer alarm circuits have been developed for providing visible or audible indications of the existence of a critical heart beat rate. Known circuits, however, are not capable of providing a single indication serving to inform an operator of the existence of an alarm condition and simultaneously to inform the operator of the nature and severity of the condition; i.e., whether the heart beat rate has increased or decreased, and to what extent.

Accordingly, it is an object of the present invention to provide an improved cardiotachometer alarm circuit.

Another object of the invention is to provide an improved vane controlled oscillator.

A further object is to provide a vane controlled oscillator with high sensitivity to vane position.

Yet another object of the invention is to provide a vane controlled oscillator with simple and effective circuitry for preventing loading of the vane by the oscillator.

Another object is to provide a vane controlled oscillator having circuitry for detecting the presence or absence of oscillations wherein the detecting circuitry is used to limit the amplitude of the oscillations and also as an amplifier.

Still a further object of the present invention is to provide an improved alarm circuit for providing visible or audible alarm indications.

Another object of the invention is to provide a cardiotachometer alarm circuit having novel means for giving an audible indication of each heart beat.

A further object of the invention is to provide an improved cardiotachometer alarm circuit for providing, during an alarm condition, a continuous alarm indication including a superimposed audible indication of each heart beat.

Briefly, a cardiotachometer alarm circuit embodying the features of the present invention may include a heart beat rate meter, the reading of which is determined by a signal developed by an input or logic circuit. The level of the signal from the input circuit is dependent upon the heart beat rate of a monitored patient. A pair of vane controlled oscillators provide an alarm signal when the meter moves to positions corresponding to a heart beat rate above a predetermined high rate or below a predetermined low rate. Each oscillator circuit includes a pair of coils arranged along the path of movement of a vane moved by the meter, the vane intersecting one pair at a high beat rate and the other pair at a low beat rate.

The coils of each pair are inductively coupled together to provide a feedback control signal from an output coil to a control coil when the vane is not between the coils. Movement of the vane between the coils interrupts the feedback and thereby changes the condition of the oscillator between oscillating and non-oscillating conditions. In one embodiment of the invention, a normally oscillating tickler coil oscillator is used and movement of the vane between the coils interrupts the regenerative feedback and halts the oscillator operation. In another embodiment a tuned-plate tuned-grid or T.P.T.G. oscillator is used, and the oscillator is normally in a non-oscillating condition due to negative feedback between the coils. Movement of the vane between the coils interrupts the negative feedback and oscillations commence.

By virtue of one feature of the invention, the oscillator of the cardiotachometer alarm circuit is non-self regulating, and thus is highly sensitive to vane position. The oscillator includes an oscillator transistor connected in circuit with the control coil and the feedback signal to this coil from the output coil is effective to control the state of the oscillator. In order to provide for fast action of the oscillator in response to vane movement, the control coil is connected to the input of the oscillator transistor through a circuit having no capacitive elements. Thus an entirely conductive path is provided from the oscillator transistor input electrodes to the control coil and no self-biasing potential can be developed. Further to provide a fast action, the output circuit of the oscillator transistor similarly includes only resistive and inductive elements.

The cardiotachometer alarm circuit additionally comprises an amplifier-detector section coupled to each of the two oscillators for detecting the presence or absence of oscillations and for providing a DC signal dependent upon the state of the oscillators. The circuit also includes an alarm energizing circuit which can be conditioned to provide either an audible or visible alarm when the heart beat rate reaches an alarm condition.

In accordance with another feature of the invention, the vane controlled oscillator is prevented from loading the meter vane and thereby affecting the position of the meter and the accuracy of the meter response. Thus, there is provided a semi-conductor junction in shunt with the oscillator output coil for limiting the amplitude of the oscillations. In one embodiment of the invention, the semiconductor junction may comprise the base-emitter junction of a transistor associated with the amplifier-detector section of the circuit. In a second embodiment of the invention, the semi-conductor junction comprises a diode connected in shunt with the coil. In these two arrangements the amount of current flowing through the coil during alternate half cycles of oscillation is limited by the shunt current path provided through semi-conductor junction and the amplitude of the oscillations developed in the oscillator is thereby restricted to a low level. Oppositely poled diodes may also be used in order to reduce the oscillation amplitude even further, if desired.

In accordance with another feature of the invention, the alarm circuit portion of the cardiotachometer may be operated in two modes, one for energizing an indicating lamp and the other for energizing an audible indicator such as a speaker. In the lamp mode, the alarm circuit acts as an amplifier providing an energizing current for the lamp. In the buzzer mode, the alarm circuit functions as an audio frequency oscillator or generator for the speaker. In order to provide not only a continuing audible alarm, but also a superimposed audible indication of each heart beat, a pulse signal corresponding to each heart beat is injected into the oscillator circuit whereby an audible heart beat signal is superimposed on the audible alarm.

Other objects and advantages of the present invention will become apparent from the following description of illustrative embodiments thereof, in connection with which reference is had to the accompanying drawing, in which.

Figures 1, 2, 3:
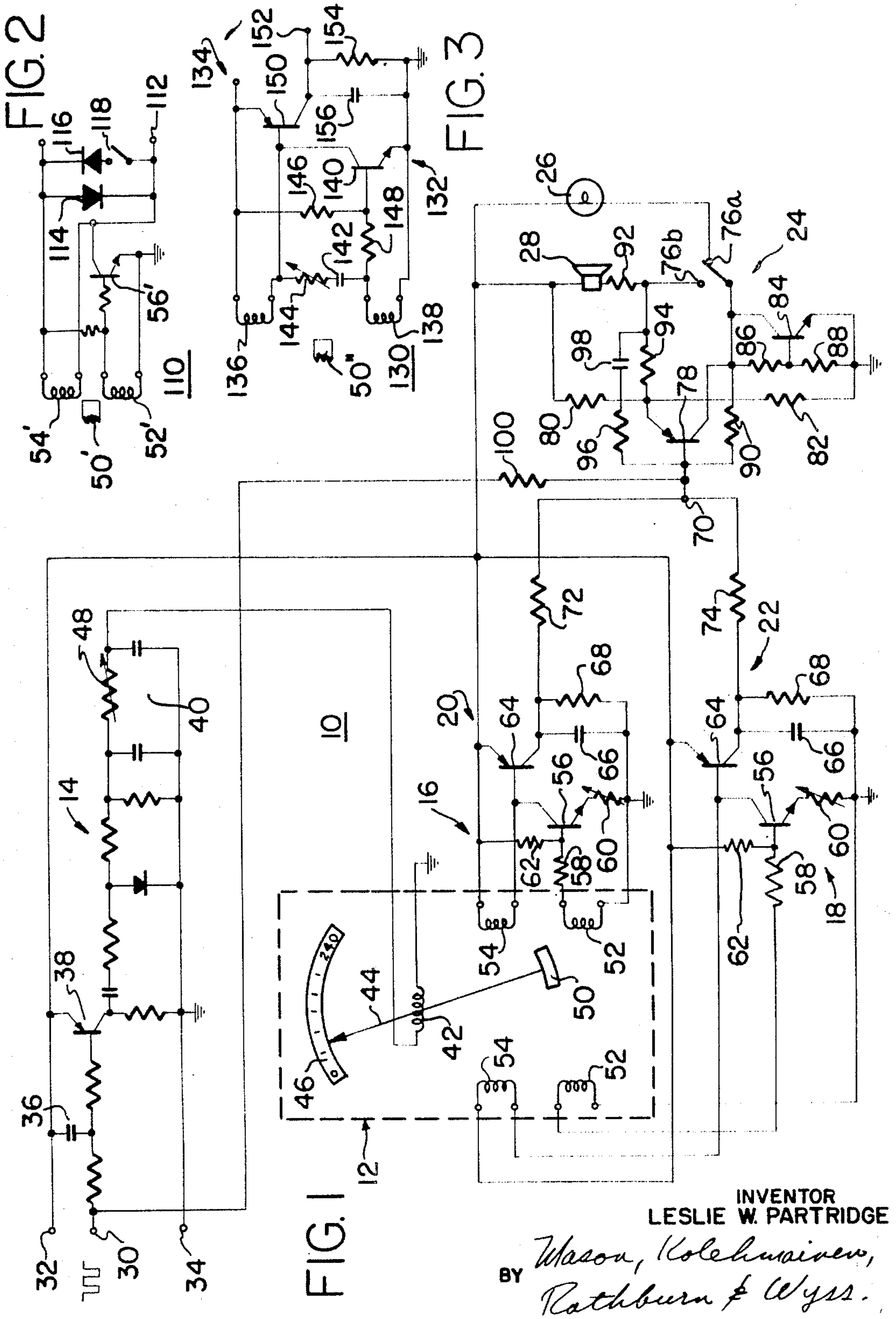
FIG. 1 is a schematic and diagrammatic illustration of a cardiotachometer alarm circuit embodying the features of the invention and including a vane controlled oscillator of the tickler coil type.
FIG. 2 is a schematic diagram of an oscillator circuit comprising an alternative embodiment of the invention.
FIG. 3 is a schematic diagram of a tuned-plate tuned-grid oscillator circuit and amplifier-detector comprising yet another embodiment of the invention.

Having reference now to the drawing and initially to FIG. 1 there is illustrated a cardiotachometer alarm circuit constructed in accordance with the present invention and generally designated as 10. The circuit includes a heart beat rate meter 12 for visually displaying the heart beat rate. The meter is operated by a signal provided by an input or logic circuit generally designated as 14, the function of this circuit being to provide a DC signal proportional to the rate of input pulses corresponding to the heart beats of a monitored patient.

In order to initiate an alarm indication when the heart beat rate falls below a predetermined minimum rate or rises above a predetermined maximum rate, the cardiotachometer circuit 10 includes a pair of oscillators 16 and 18, one for low heart beat rates and one for high heart beat rates. The oscillators 16 and 18 are responsive to meter position and are changed between oscillating and non-oscillating conditions when a critical heart beat rate condition exists. The circuit includes amplifier-detector circuits 20 and 22 for detecting the condition of the oscillators 16 and 18 and for providing an alarm signal when a critical condition exists. An alarm energizing circuit 24 energizes either a lamp 26 or a speaker 28 in response to an alarm signal from the amplifier-detectors 20 and 22.

The cardiotachometer circuit 10 may be used with suitable apparatus for picking up heart beat signals and for providing a pulse signal corresponding to each beat of the heart. Thus, the input circuitry includes an input terminal 30 for the reception of these pulse signals, and additionally includes supply terminals 32 and 34 for connection to a source of energizing potential. A filter 36 is included to filter any sixty cycle interference, and an amplifier 38 amplifies the pulse input signals after which they are forwarded to an integrator circuit 40 which serves to provide a DC signal directly proportional to the monitored heart beat rate.

The DC signal from the input circuit 14 is supplied to a coil 42 of the movement of the meter 12. The meter includes a pointer 44 registering with a suitable heart beat rate scale 46 in known manner. The input circuit 14 includes a variable resistor 48 for aligning the meter. Thus it will be appreciated that the deflection of the pointer 44 is directly proportional to the frequency of the pulse signals received at input terminal 30, and thus to the heart beat rate.

In order to control the condition of the oscillators 16 and 18, a vane 50 is connected to move with the meter pointer 44. The oscillators 16 and 18 each include a control coil 52 and an output coil 54, these coils being arranged along the path of movement of the vane 50 so that if the pointer 44 moves to a predetermined critical low heart beat rate condition, the vane 50 moves between the coils of the oscillator 16, and similarly if the pointer 44 moves to a predetermined high heart beat rate position, the vane 50 moves between the coils of the oscillator 18. If desired, the coils 50 and 52 may be adjustably mounted within the body of the meter 12 whereby the high and low heart beat rate positions may be adjusted.

The oscillators 16 and 18 are adapted to be changed between oscillating and non-oscillating conditions by the movement of the vane 50. These oscillators are of the tickler coil type and include an oscillator transistor 56 having an input comprising the base and emitter electrodes. The input is connected in a control or input circuit including resistors 58 and 60 and the control coil 52. The collector electrodes of the transistors 56 are each connected in an output circuit including the output coil 54, the output circuit being in circuit between the supply terminals 32 and 34. A bias potential is applied to the base electrodes of the transistors 56 through circuits including biasing resistors 62, and the variable resistors 60 may be adjusted to control the sensitivity of the oscillators and thus the vane positions at which the oscillators are changed between conditions. If coils 52 and 54 are movable, resistor 60 may have a fixed value.

In the normal condition of the cardiotachometer 10, when the heart beat rate is in the normal range between the predetermined high and low heart beat rates, the oscillators 16 and 18 are in an oscillating state, by virtue of a positive or regenerative feedback through the inductively coupled coils 52 and 54. When the vane 50 moves between a pair of coils 52 and 54, the feedback is reduced and oscillations of the corresponding oscillator cease.

In accordance with a feature of the invention, and in order that the oscillators 16 and 18 are extremely sensitive to the position of the vane and act abruptly over a small increment of vane movement, the oscillators 16 and 18 are non-self regulating. In order to prevent self regulation of the oscillator, the control circuit provides an entirely conductive path between the inputs of the transisors 56 and the control coils 52. The control circuit provides a conductive path because no capacitive elements are included in the control circuit. As a result, no self-biasing voltage can be developed in the control circuit to maintain oscillations after the vane interrupts the regenerative feedback between the coils 52 and 54. Rather, only the resistors 58 and 60 and the control coil 52 are included in the control circuit. Accordingly, when the vane 50 moves between the coils 52 and 54 of either oscillator, the oscillations cease very rapidly. The sensitivity and speed of the oscillators 16 and 18 surpass those of prior art arrangements wherein capacitive elements are included in the oscillator circuit.

Further to insure fast action of the oscillators 16 and 18, capacitive elements are similarly omitted from the output circuits of the oscillator transistors. Thus, no self-biasing potential is applied in the emitter circuits of the oscillators 16 and 18.

In order to detect the presence or absence of oscillations of the oscillators 16 and 18, the amplifier-detector circuits 22 each include a transistor 64 each having a base electrode connected to the collector of an oscillator transistor 56. The emitters of the transistors 64 are connected to the supply terminal 32, the collectors being connected to the other supply terminal through a capacitor 66 and a parallel connected resistor 68. When the corresponding oscillator 16 or 18 is in its oscillating condition, the amplifier-detector transistor 64 is periodically placed in a conductive state by the voltage across the output coil 54, thus charging the capacitor 66 to a voltage approximating the voltage of the potential source. In the normal condition of the cardiotachometer circuit 10 when the monitored heart beat is between the predetermined limits, the oscillators 16 and 18 serve to charge both capacitors 66 and a positive DC signal is applied to an amplifier-detector output terminal 70 through a pair of resistors 72 and 74.

When an alarm condition arises due to an increase or decrease in the heart beat rate, the vane 50 causes the oscillation of one of the oscillators 16 and 18 to stop. The transistor 64 of the corresponding amplifier-detector circuit is no longer periodically placed in a conductive condition, and as a result, the corresponding capacitor 66 discharges through the parallel connected resistor 68 thus forwarding an alarm signal to the terminal 70 by deceasing the potential at that terminal.

In accordance with a feature of the invention, the oscillators 16 and 18 are prevented from loading the vane 50 of the meter 12 and thereby adversely affecting the accuracy of the meter response. In vane controlled oscillators of the prior art, the oscillating signal in the oscillator coils causes a reaction of the vane whereby the vane is moved and the meter reading is rendered inaccurate. This disadvantage is overcome in the circuit of the present invention by the provision of a novel arrangement for limiting the amplitude of the oscillations of the oscillators 16 and 18. Thus the base-emitter junction of the amplifier-detector transistor 64 is connected across the output coil 54. During half of each cycle of oscillation, current is diverted from the output coil 54 through the base-emitter junction of the transistor 64 whereby oscillation amplitude is reduced. It will be appreciated that the base-emitter semiconducting junction of the transistor 64 functions as a non-linear one way conducting device in the nature of a diode. Since the amplitude oscillation is held to a relatively low level by means of the semiconducting base-emitter junction in shunt with the output coil 54, the oscillations do not load or move the vane 50 and the meter response is highly accurate.

Proceeding now to a description of the alarm energizing circuit 24, this circuit includes a pair of switching contacts 76*a* and 76*b* for controlling the mode of operation of the energizing circuit 24 and for selecting either a visible indication with the lamp 26 or an audible indication with the speaker 28.

The energizing circuit 24 includes a transistor 78 having its base electrode connected to the amplifier-detector output terminal 70. A bias potential is applied to the emitter electrode of the transistor 28 by means of a voltage dividing circuit including resistors 80 and 82, and the transistor 78 is normally held in a non-conductive state by means of the positive potential applied to the terminal 70 by oscillators 16 and 18 and amplifier-detectors 20 and 22. The collector of the transistor 78 is connected to the base of a grounded emitter transistor 84 through a resistor 86, and the transistor 84 is normally held in a non-conductive state since no conductive path exists through transistor 78. A leakage resistor 88 provides temperature compensation.

In the illustrated condition of the energizing circuit 24, with the switch contact 76*a* closed, the lamp 26 is energized to provide an indication when an alarm condition arises. Thus, when the potential of the terminal 70 drops as described previously, the transistor 78 is placed in a saturated conductive state causing the potential applied to the base of the transistor 84 to increase and thereby causing the transistor 84 to be placed in a conductive state. The transistor 84 is connected in series through switch contacts 66*a* with the lamp 26 which is energized to provide a visual indication of the alarm condition. A resistor 90 provides feedback to insure positive off or on operation, thereby protecting against excessive power dissipation in transistor 84 caused by partial energization of the lamp 26.

When the switch contacts 76*b* are closed, energizing circuit 24 functions as an AF oscillator or generator to energize the speaker 28. Thus the collector electrode of the transistor 84 is connected to the base of the transistor 78 through the resistor 90, and the speaker 28 is connected to the emitter elecrode of the transistor 78 through a pair of resistors 92 and 94. The resistor 94, when the switch contacts 76*b* are closed, serves to desaturate the transistor 68, and a positive feedback for sustaining oscillations is provided through the contacts 76*b* by a resistor 96 and capacitor 98 coupled between the base of transistor 78 and the collector of the transistor 84. Thus when the switch contacts 76*b* are closed and an alarm condition exists, the transistors 78 and 84 oscillate thus generating an audio frequency oscillating signal to produce an alarm tone through the speaker 28.

In accordance with a feature of the present invention, the audible alarm tone not only provides an indication of the existence of an alarm condition, but also provides information as to the nature and the severity of the alarm. In prior art circuits, when an audible alarm is given, an operator only knows that the heart beat has deviated from the acceptable range. With the circuit of the present invention, the operator is able to determine whether the heart beat is too slow or too fast, and to what extent, merely by listening.

In order to accomplish this object of the invention, an audible indication of each heart beat is superimposed upon the audible alarm tone by means of a pulse signal injected from the pulse input terminal 30 to the base of the transistor 78 through a limiting resistor 100. Each time a pulse is applied to the base of the transistor 78, the frequency of the tone heard through the speaker 28 changes about half a note and the heart beats are clearly audible to a listener. Thus, by listening to the heart beat indication superimposed upon the alarm tone produced by the speaker 28, the operator of the circuit 10 can determine the nature and the severity of the alarm condition.

Having reference now to FIG. 2, there is illustrated a vane controlled oscillator circuit generally designated as 110 and comprising an alternative embodiment of the invention. The oscillator 110 is similar in many respects to the oscillators 16 and 18 of the circuit 10, but includes an alternative arrangement for limiting the oscillation amplitude and thereby preventing loading of the vane. Thus the circuit 110 includes a movable vane 50' and control and output coils 52' and 54' connected to form a tickler coil oscillator with an oscillator transistor 56'. Connected in shunt with the output coil 54' and between one supply terminal and an output terminal 112 is a semi-conductor diode 114. The diode 114 functions in substantially the same manner as the base-emitter junction of the transistor 64 in the oscillators 16 and 18 of the circuit 10 to prevent loading of the vane. Thus, during alternate half cycles of operation of the oscillator 110, current is diverted from the output coil 54' through the diode 114, thereby reducing oscillator amplitude.

The circuit of FIG. 2 is illustrated as including another semi-conductor diode 116 in series with a switch 118 to illustrate another arrangement wherein oppositely poled parallel connected diodes are used to reduce the amplitude of the oscillations even further. When the switch 118 is closed, the current through the output coil 52 is reduced during both half cycles of oscillations and as a result the oscillation amplitude is further reduced.

Proceeding now to FIG. 3 there is illustrated a vane controlled circuit generally designated as 130 comprising yet another embodiment of the invention. The circuit 130 includes a vane controlled oscillator generally designated as 132 of the tuned-plate tuned-grid or T.P.T.G. type. The circuit 130 additionally includes an amplifier-detector generally designated as 134.

The oscillator 132 includes a pair of spaced output and control coils 136 and 138 inductively coupled together in negative or degenerative feedback relation and disposed along the path of movement of a vane 50''. The oscillator includes an oscillator transistor 140, and the coils 136 and 138 are part of a tank circuit additionally including a small-valued capacitor 142 and a variable resistance 144. A bias voltage is applied to the base of the oscillator transistor 140 through a voltage dividing network including a pair of resistors 146 and 148.

In the normal condition of the circuit 130, when the vane 50'' is not between the coils 136 and 138, the negative feedback between these coils prevents oscillations from being developed by the oscillator circuit 132. Thus the oscillator 132 is normally non-oscillating, unlike the oscillators 16 and 18 of FIG. 1. When the vane 50'' moves between the coils, the negative feedback is reduced and oscillations commence.

In accordance with the invention, the oscillator 132 is similar to the oscillators 16 and 18 in that the oscillator is non-self regulating, and thus is highly sensitive to vane position and is fast acting between conditions of oscillation and non-oscillation. Thus the input of the transistor 140, comprising the base and emitter electrodes, is connected to the control coil 138 through an entirely conductive circuit including only the resistance 148. Further, the output circuit of the transistor 140 includes no capacitive elements. Thus, in the embodiment of FIG. 3 as well as in the embodiments of FIGS. 1 and 2, the establishment of self-biasing potentials on the electrodes of the transistor 140 is prevented, and the oscillator 132 is thereby capable of reacting very abruptly to movement of the vane 50''. It should be noted that the capacitor 142 in the tank circuit of the oscillator is of a small value and does not cause self regulating of the oscillator in this type of circuit. For example, the capacitor 142 may have a value of about $500\times10^{-12}$ farads.

The circuit 130 is provided with an amplifier-detector 134 including an transistor 150. The transistor 150 is in a non-conductive state when the oscillator 132 is in a non-oscillating condition and is periodically placed in a conductive state when oscillations occur. Thus, when the vane 50'' is not between the coils 136 and 138, and no oscillations occur, the output terminal 152 is held at a low potential by means of a resistor 154 interconnecting the terminal 152 and ground. When the vane moves between the coils in response to a critical heart beat rate and oscillations occur, the transistor 150 is pulsed on and causes a potential difference to be imposed across a capacitor 156, thereby providing a positive DC potential at the output terminal 152. Since the alarm signal produced at the output terminal 152 comprises an increase in potential rather than a decrease as is the case with the embodiment of FIG. 1, the circuit 132 cannot be used with the alarm energization circuit 24 of FIG. 1. However, the adaption of the alarm energization circuit of FIG. 1 to the circuit 132 is well within the ability of one skilled in this art.

The circuit 130 includes an arrangement similar to that of the circuit 10 for limiting the oscillation amplitude of the oscillator 132 and thereby preventing loading or movement of the vane 50''. Thus the base-emitter junction of the transistor 150 is connected in shunt with the coil 136. It should be appreciated that if desired an arrangement of a single diode or of two diodes could be used in place of the transistor 150 in the circuit of FIG. 3.

While the present invention has been described in connection with the details of illustrative embodiments thereof, these details are not intended to be limitative of the invention except insofar as set forth in the accompanying claims.

What is claimed as new and desired to be secured by Letters Patent of the United States is:

1. A vane controlled circuit comprising an oscillator including a controlled conduction device having output and input circuits, first and second coils inductively coupled to one another and connected respectively to said output and input circuits to transfer a feedback signal, a vane movable between the coils to control feedback and the operation of the oscillator, and a transistor connected to said oscillator for detecting and amplifying oscillations, the base-emitter junction of said transistor shunting said first coil for reducing current flow therethrough, thereby to limit loading of the vane.

2. A vane controlled oscillator comprising an oscillator transistor having base, emitter and collector electrodes, a first coil coupled to said base electrode and a second coil connected in series with the emitter-collector circuit of said oscillator transistor, said first and second coils being inductively coupled to transfer feedback signals, a vane movable between said coils for interrupting said feedback signals, and an amplifier transistor for detecting and amplifying oscillations, said amplifier transistor including a base electrode connected to one side of said second coil and an emitter electrode connected to the other side of said second coil, the base-emitter junction of said amplifier transistor serving to reduce current flow in said second coil.

3. A vane controlled oscillator comprising:

a transistor having an input including base and emitter electrodes and having an output including output electrode means;

a first coil coupled to said output electrode means;

a second coil coupled to said input;

said second coil being inductively coupled to said first coil for developing feedback signals for controlling the operation of said transistor;

a vane movable to control the inductive coupling between said first and second coils;

biasing means for applying a direct current bias to said transistor in superposition to said feedback signals, said biasing means including means coupling said base and emitter electrodes to a source of DC potential, said last-mentioned means consisting of said second coil and of resistance means;

and an additional transistor coupled to said output electrode means for detecting and amplifying oscillations, said additional transistor including a base-emitter junction connected in parallel with said first coil for reducing current flow therethrough to prevent loading of the vane.

4. A vane controlled oscillator as defined in claim 3 wherein said first and second coils are in positive feedback relation, and said feedback signals cause oscillations.

5. A vane controlled oscillator as defined in claim 3 wherein said first and second coils are in negative feedback relation, and said feedback signals prevent oscillations.

References Cited

UNITED STATES PATENTS

| | | | |
|---|---|---|---|
| 2,505,577 | 4/1950 | Rich | 317—146 |
| 2,587,294 | 2/1952 | Dorbec | 331—183 |
| 2,706,250 | 4/1955 | Donath | 317—146 |
| 2,829,324 | 4/1958 | Sargeant | 331—181 |
| 3,098,981 | 7/1963 | Foster et al. | 331—159 |
| 3,360,745 | 12/1967 | Kretzmer | 331—117 |
| 2,985,848 | 5/1961 | Raffaelli | 331—181 |

FOREIGN PATENTS

| | | |
|---|---|---|
| 817,319 | 7/1959 | Great Britain. |

JOHN KOMINSKI, Primary Examiner

U.S. Cl. X.R.

128—2.05; 331—181, 183, 109